(12) United States Patent
Sasaki (10) Patent No.: US 6,402,027 B1
(45) Date of Patent: *Jun. 11, 2002

(54) ELECTRONIC MONEY PROCESSING METHOD AND SYSTEM THEREOF AND A RECORDING MEDIUM RECORDING A PROGRAM THEREOF

(75) Inventor: Shigeru Sasaki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/686,961

(22) Filed: Oct. 12, 2000

Related U.S. Application Data (63) Continuation of application No. 09/188,365, filed on Nov. 10, 1998, now Pat. No. 6,155,484.

(30) Foreign Application Priority Data

Nov. 14, 1997 (JP) .............................................. 9-313179

(51) Int. Cl.[7] .............................................. G06F 17/60
(52) U.S. Cl. .................. 235/379; 235/380; 705/17; 705/39
(58) Field of Search ................................ 235/375, 379, 235/380–384; 705/1, 13–45

(56) References Cited

U.S. PATENT DOCUMENTS

| 5,461,217 A | 10/1995 | Claus .......................... 235/380 |
| 5,753,899 A | * 5/1998 | Gomm et al. ................ 235/381 |
| 5,754,654 A | 5/1998 | Hiroya et al. ................. 705/76 |
| 5,768,385 A | 6/1998 | Simon .......................... 705/69 |
| 5,832,089 A | 11/1998 | Kravitz et al. ................ 705/69 |
| 5,839,119 A | 11/1998 | Krsul et al. .................... 705/39 |
| 5,850,442 A | 12/1998 | Muftic ........................ 705/65 |
| 5,872,844 A | 2/1999 | Yacobi ........................ 705/69 |
| 5,878,138 A | 3/1999 | Yacobi ........................ 705/69 |
| 5,905,976 A | 5/1999 | Mjolsness et al. ............. 705/39 |
| 5,999,625 A | 12/1999 | Bellare et al. ................. 705/64 |
| 6,003,765 A | 12/1999 | De Rooij et al. ........... 235/379 |
| 6,119,946 A | * 9/2000 | Teicher ........................ 235/492 |
| 6,138,911 A | * 10/2000 | Fredegill et al. ............ 235/383 |

* cited by examiner

Primary Examiner—Michael G. Lee
Assistant Examiner—Jamara A Franklin
(74) Attorney, Agent, or Firm—Mattingly, Stanger & Malur, P.C.

(57) ABSTRACT

An electronic money system of a token and value mixed type includes an electronic money card of a type in which a token type for preferentially paying the coin money and paying the bill money when a coin money balance is insufficient for payment, and for recording issuance numbers of bills paid/received in a transaction history in a memory area of the electronic money card. An automatic transaction machine (ATM) reads, from an electronic money card, issuance numbers of bills for deposit and an issuance number of an invalid bill, and transmits the numbers to a computer of a bank.

15 Claims, 5 Drawing Sheets

ELECTRONIC MONEY PROCESSING METHOD AND SYSTEM THEREOF AND A RECORDING MEDIUM RECORDING A PROGRAM THEREOF

This is a continuation application of U.S. Ser. No. 09/188,365, filed Nov. 10, 1998 now U.S. Pat. No. 6,155,484.

BACKGROUND OF THE INVENTION

The present invention relates to an electronic money card and an apparatus handling an electronic money card, and in particular, to an electronic money card of an electronic money type in which a token type and a value type are mixed, to an electronic money system handling the electronic money card, and to an apparatus for use with the electronic money card in the electronic money system.

Attentions has been recently attracted to an electronic commerce (EC). In such commercial systems, an electronic money system using an IC card is to about to be put to practice in which electronic money can be used in a store existing on a network such as the Internet and an actual store. Electronic money systems using IC cards are classified into systems of "closed loop type" and "open loop type" on one hand and into those of "token type" and "value type" on the other hand.

One of the problems associated with practical uses of such electronic money systems of the IC card type is prevention of money laundering for money illegally gained. ("Money laundering" is conducted so that any traces of the dubious money are erased and the money is beyond the reach of the police.) In the electronic money system of the closed loop type, when a transaction is achieved by a store and a financial institution or facility such as a bank with an electronic money card, personal transaction history recorded in the electronic money card is transferred to a computer of the bank. Since personal information is accumulated in the bank, there exists a fear of invasion of privacy. Moreover, a large volume of transaction history is transmitted via terminal devices and automatic transaction machines of stores and a network to the computer of the bank, to be accumulated as transaction history in a recording apparatus of the computer. Consequently, there arises a problem of increase in cost for communication, processing, and accumulation of information. In the electronic money system of the open loop type, the personal history is not acquired by the computer of the bank when a transaction is achieved by an electronic money card. Therefore, the invasion of privacy is prevented and the problems related to the communication, processing, and accumulation cost can be avoided. However, there also remains the problem of how to trace the electronic money transported for the money laundering.

On the other hand, in the electronic money system of the value type, the balance of electronic money in the electronic money card is managed only in accordance with the value (amount). Namely, this system is quite simple and can be easily put to practice. However, since only the amount of payment or receipt is recorded in the transaction history of the electronic money card, the tracing of electronic money transported causes difficulties.

In the electronic money system of the token type, the electronic money balance is managed by the issuance number of each electronic bill. That is, the transaction history includes the bill issuance numbers and hence the transported electronic money can be easily traced. However, since the minimum unit of money is one yen for the bill issuance number, the cost of accumulating the transaction history in the electronic money card is increased and the processing time is accordingly elongated. Consequently, this system is unsuitable for practice.

SUMMARY OF THE INVENTION

It is therefore an object of the present invention to provide an electronic money system in which the privacy of each customer can be ensured and the transported electronic money can be easily traced without increasing the cost of communication, accumulation, and processing of information and data with respect to an electronic money card and a computer of a financial facility and the like.

Another object of the present invention is to provide an electronic money card which can be satisfactorily used for transactions of a small amount of money with a little increase in the cost and which ensures the privacy and helps tracing the transported electronic money for the prevention of money laundering.

In accordance with the present invention, there is provided an electronic money card of a token and value mixed type. In the electronic money card, there are stored issuance numbers of relatively large denomination bills and the balance of coins as a value amount. When the coin balance is equal to or more than the transaction amount, the coins are preferentially used for the payment. When the coin balance is insufficient, bills are used therefor. For a remaining amount of a transaction for which the coin balance and the bills are not appropriately used for the payment, a bill is changed into a value amount of coins and used for the payment. Additionally, in accordance with the present invention, there is provided an electronic money transporting apparatus or transporter to handle the electronic money card of the token and value mixed type. From an electronic money card of a payer, the transporter receives an issuance number of a bill and/or a value amount of coins and then passes the number and the value amount to an electronic card of a recipient. The card of the recipient stores the received number in an internal storage thereof and adds the value amount of coins to the coin balance.

Furthermore, when a bill is changed into a value amount of coins in an electronic card, the issuance number of the bill thus changed is recorded as an invalid bill in the electronic card. In this case, the invalid bill is also used as a clue or lead to trace the transported electronic money. In a transaction achieved by an electronic money card with a financial facility, an automatic transaction machine (ATM) receives a card identifier (ID) and an issuance number of the invalid bill from the electronic money card during a depositing or withdrawing operation and then transmits the card ID and the issuance number to a computer of the financial facility. Particularly, in the money depositing operation, the ATM receives an issuance number of a bill deposited from the electronic money card and transmits the number to the computer. On receiving the issuance number of the deposited bill and the issuance number of the invalid bill, the ATM then and then stores the card ID and the received issuance numbers in a storage with a correspondence established therebetween.

As described above, in accordance with the present invention, the electronic money card is a token and value mixed type in which a bill having an issuance number and coins having only a value amount are appropriately utilized depending on cases. Therefore, there is provided an electronic money card in which the transferred electronic money can be easily traced and a transaction of a small amount of money can be efficiently carried out without increasing the cost. Additionally, when conducting a transaction by an electronic money card with a financial facility, the issuance number of the invalid bill registered to the card and the issuance number of the deposited bill are accumulated in a computer of the financial facility. However, since the transaction history recorded in the card is not passed to the side of the financial facility in the open loop system, there can be implemented an electronic money system in which the transferred electronic money can be easily traced without any invasion of privacy. Furthermore, it is possible to minimize the cost of communication, processing, and accumulation to register the invalid bill and the deposited bill to the financial facility.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Referring now to the accompanying drawings, description will be given of an embodiment of an electronic money system in accordance with the present invention.

Figure 1:
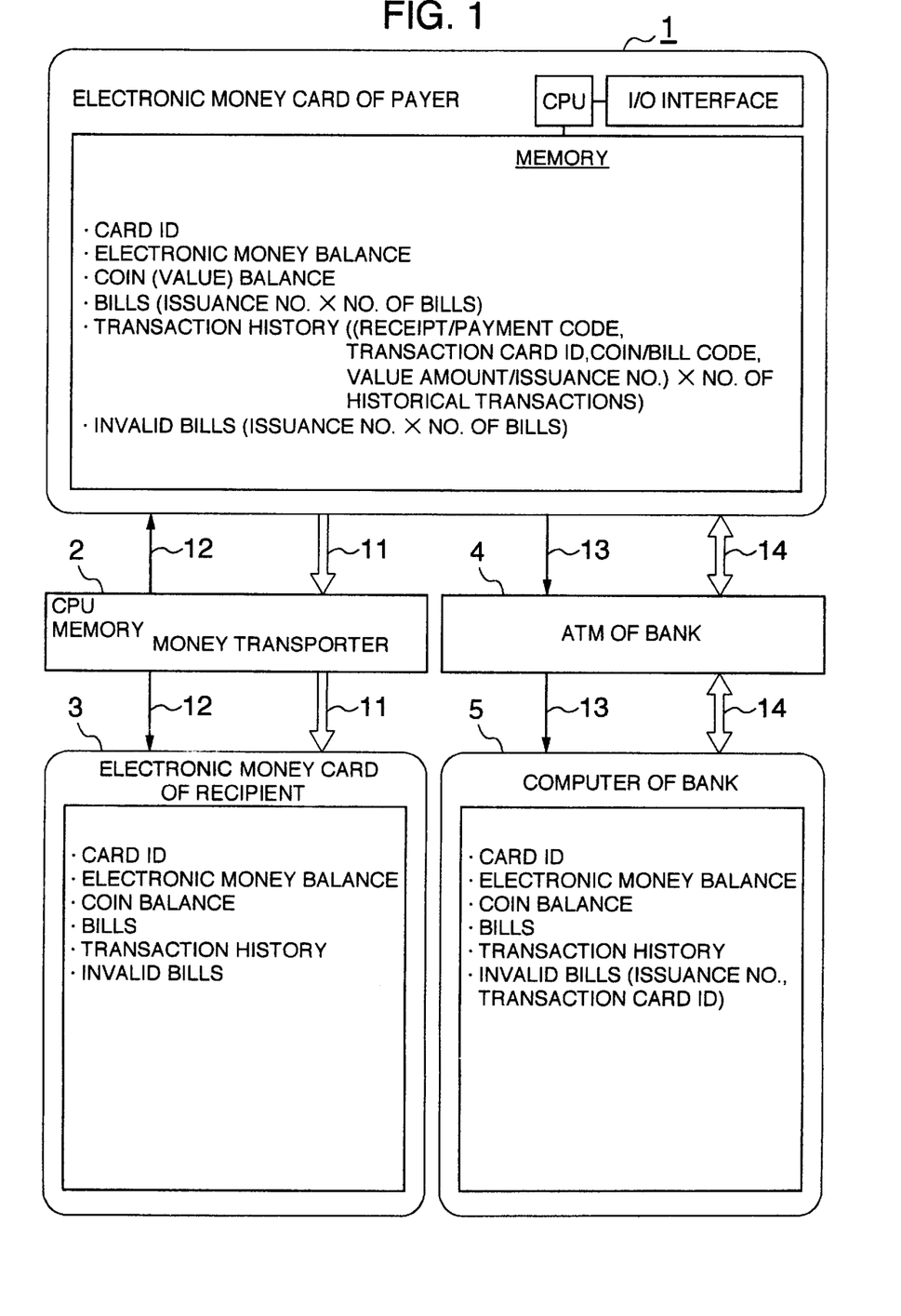
FIG. 1 is a diagram showing a flow of electronic money and data in an embodiment of an electronic money system in accordance with the present invention.

FIG. 1 shows in a schematic diagram a data layout of an electronic money card and a flow of electronic money and data. Numeral 1 indicates an electronic money card of a payer. The card 1 includes a central processing unit (CPU), an input/output interface unit, and a memory as a data area. Stored in the data area are a card ID, an electronic money balance, a coin balance, bills, transaction history, and an invalid bill. The electronic money balance is obtained as a total of the coin balance and a balance of bills. For the bills, there are stored issuance numbers of all bills of the payer. Assume that the bills have only one face or denomination value, e.g., 10,000 yen. The transaction history includes transaction history of receipt and payment of money. In the history, a receipt/payment code represents a receipt/payment transaction. A transaction card ID indicates a card ID of an electronic money card of a partner of the transaction. A coin/bill code discriminates a receipt/payment transaction achieved by use of coins or bills. As to a value/issuance number, when the coin/bill code indicates "coin", the transaction amount is recorded in terms of a value amount, and when the coin/bill code indicates "bill", the transaction amount is recorded in terms of a bill issuance number. In a transaction history, records corresponding to histories are present by considering the information above as one record. Stored in the invalid bill field are a bill issuance number of each bill which has been changed into coins and thereby becomes invalid at this point of time.

Numeral 3 represents an electronic money card of a recipient. The card 3 is substantially equal to the card 1 of the payer in the hardware and software constitution, but only different in situation in the transaction. Numeral 2 denotes a money transporting apparatus or transporter such as a point-of-sale terminal device or unit, an electronic purse, or a server on a network. The transporter 2 includes a CPU, a memory, and an input/output interface. The transporter 2 communicates with the card 1 of the payer via the input/output interfaces thereof to receive information therefrom and store the information in its memory. Thereafter, the CPU of transporter 2 sends information from the memory to the card 3 of the recipient via the input/output interfaces thereof. Numeral 11 indicates a flow of electronic money from the card 1 of the payer to the card 3 of the recipient. Numeral 12 designates a flow of information which indicates the card ID of a partner of the transaction, recipient/payment code, and transaction amount communicated between the transporter 2 and the electronic money card 1 of a payer and the electronic money card 3 of a recipient, respectively.

Numeral 5 indicates a computer (or a file thereof) of a financial facility such as a bank. The card has a data layout equal to that of the card 1 of the payer from the card ID up to the transaction history. In an invalid bill field, there are recorded the respective IDs of the cards 1 and 3 and the issuance numbers of invalid bills. Numeral 4 indicates an automatic transaction apparatus (ATM) installed in a financial facility. In this concept of ATM, there is included a banking terminal unit on the Internet. The ATM, includes a device to receive, as an input thereto, information from the cards 1 and 3. Numeral 14 indicates a flow of electronic money to indicate how the electronic money is transported between the cards 1 and 3 and the computer 5 of the financial facility. Numeral 13 denotes a flow of information to indicate how the card ID of a partner of the transaction, the bills deposited, and an invalid bill are transmitted from the cards 1 and 3 to the computer 5. When the financial facility adopts an outsourcing system in which the banking operations are to be carried out by a computer center of another firm, the computer 5 indicates a computer of the firm.

Figure 2A:
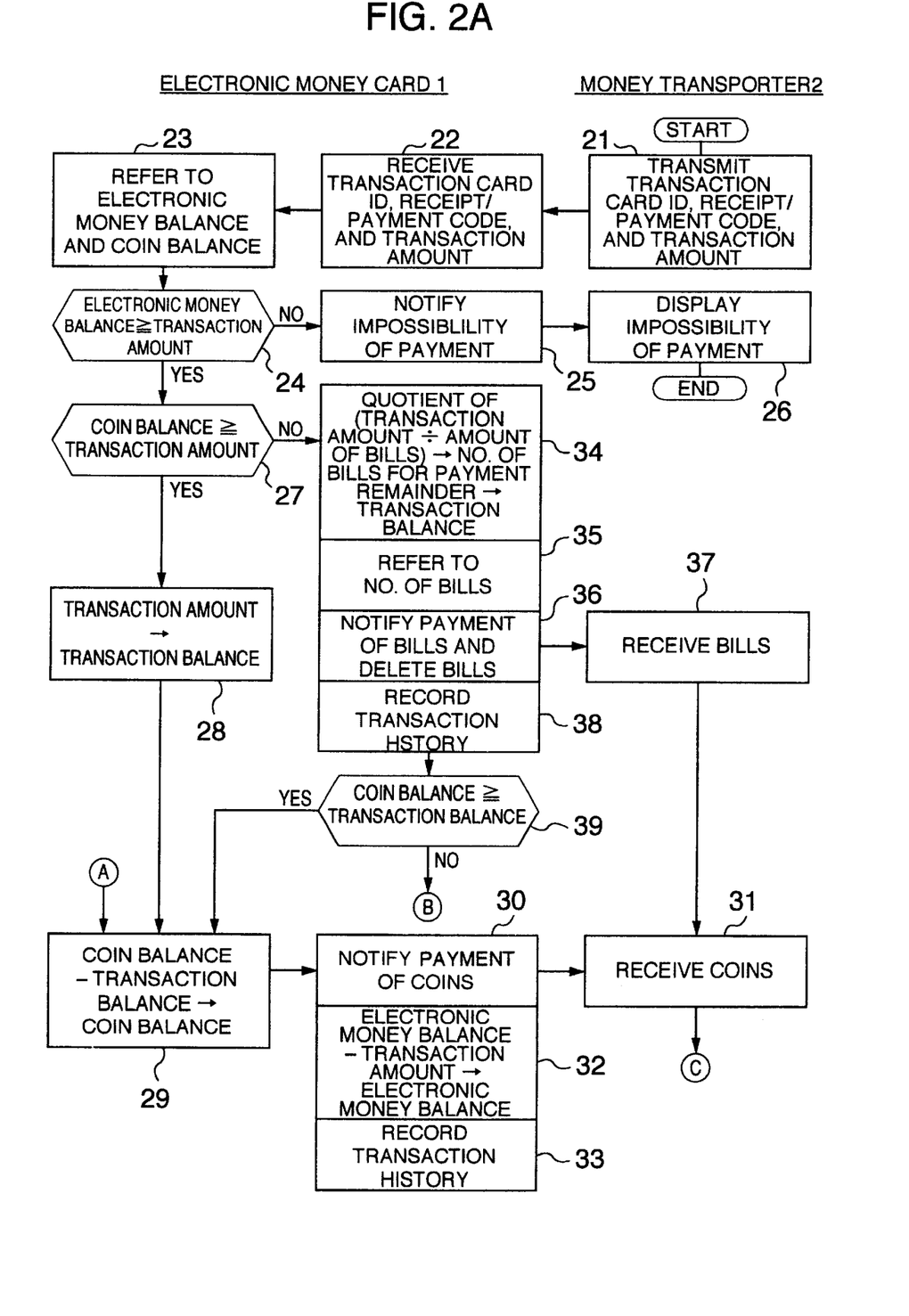
FIG. 2A is a flowchart showing a processing flow of an electronic money card 1 of a payer and a money transporter 2 in the embodiment.
Figure 2B:
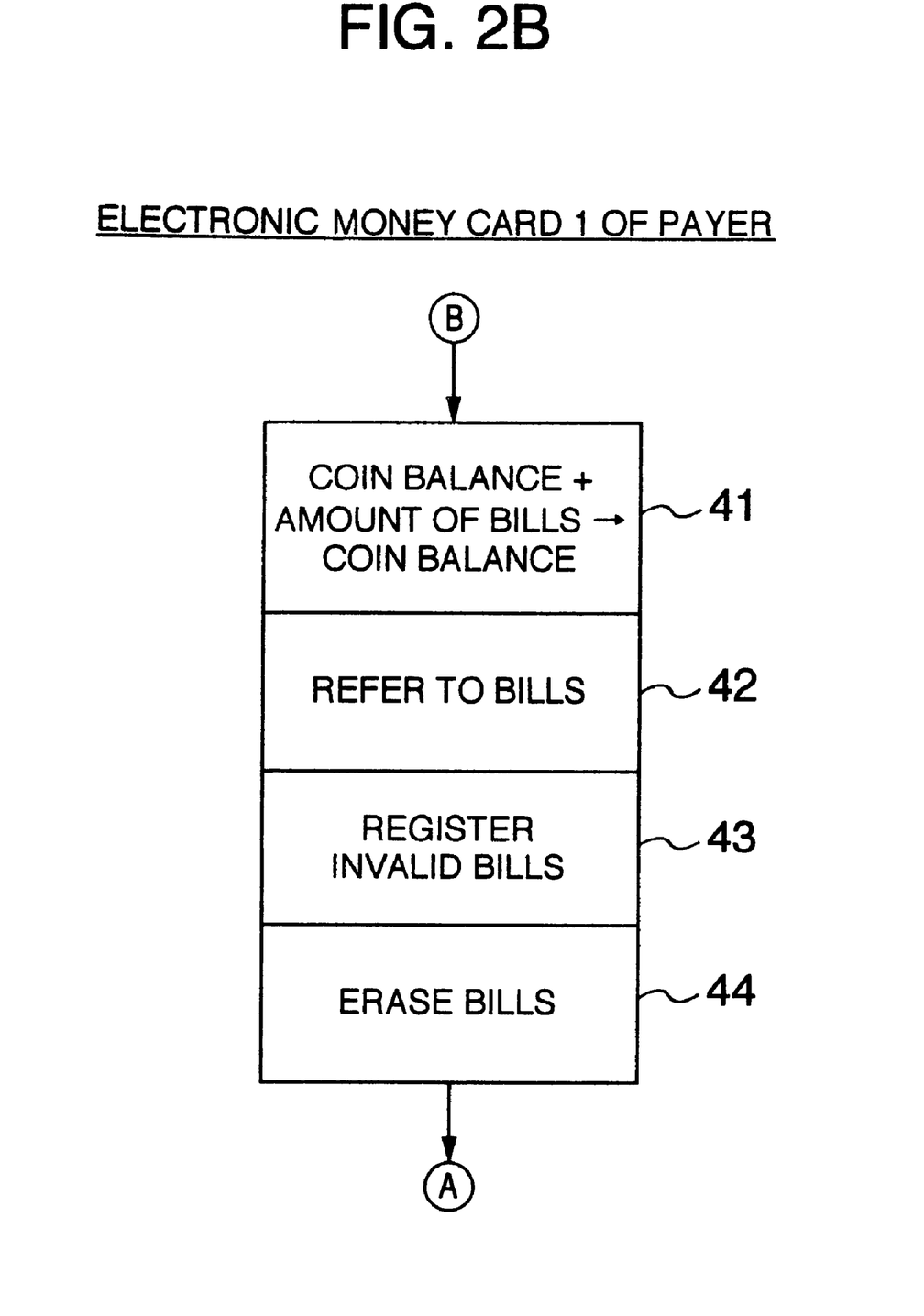
FIG. 2B is a flowchart showing a processing flow of the electronic money card 1 of the payer (after the flow of FIG. 2A) in the embodiment.
Figure 2C:
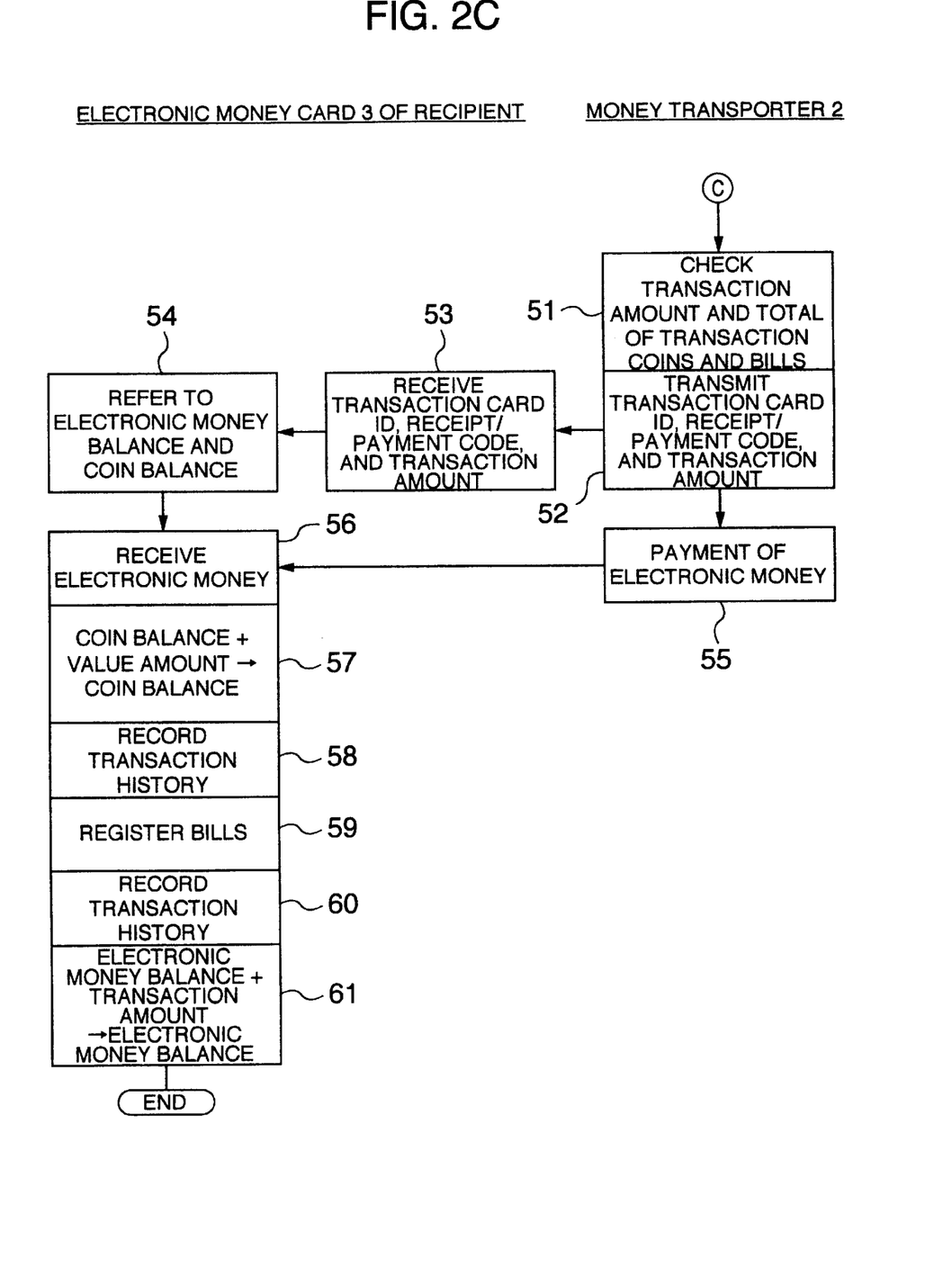
FIG. 2C is a flowchart showing a processing flow of an electronic money card 3 of a recipient and the money transporter 2 (after the flow of FIG. 2A) in the embodiment.

FIGS. 2A to 2C show in flowcharts a flow of processing in the card 1 of the payer, the money transporter 2, and the card 3 of the recipient. The transporter 2 transmits the obtained items including the card ID of the card 3, the receipt/payment code=payment code, and the transaction amount to the card 1 (step 21). The card 1 receives this information (step 22) and then refers to the electronic money balance and the coin balance in the data area (step 23). If the electronic money balance is less than the transaction amount (no in step 24), the card 1 notifies the condition of impossibility of payment to the transporter 2 (step 25). The transporter 2 responsively displays the impossibility of payment on its display device (step 26) and terminates the processing. If the electronic money balance is equal to or more than the transaction amount (yes in step 24), the card 1 checks to determine whether or not the coin balance is equal to or more than the transaction amount (step 27).

If the coin balance is equal to or more than the transaction amount (yes in step 27), the transaction amount is set to the transaction balance (step 28). An amount obtained by subtracting the transaction balance from the coin balance is set as the (new) coin balance, which is recorded in the data area to thereby update the data area (step 29). The card 1 notifies a notification of payment of the coin money to the transporter 2 (step 30). The transporter 2 receives the coin money (step 31), and then proceeds to processing of step 51 (FIG. 2C). Next, the card 1 subtracts the transaction amount from the electronic money balance to produce the (new) electronic money balance and then records the obtained balance in the data area to thereby update the data area (step 32). The card 1 writes one record of transaction history in the memory (step 33). In the transaction history record, the receipt/payment code records the "payment code", the transaction code ID records the "card ID from the transporter 2", the coin/bill code records the "coin code", and the value amount/issuance number records the "transaction amount", respectively. The steps 32 and 33 may be reversed.

If the coin balance is less than the transaction amount (no in step 27), the transaction amount is divided by the face value of the bill. The quotient is set as the number of bills for the payment and the remainder is assumed as the transaction balance (step 34). When the number of bills is other than zero, the issuance numbers of the pertinent bills are acquired for the payment from the data area (step 35) to be notified to the transporter 2. Thereafter, the number of the bills paid is deleted from the data area (step 36). The transporter 2 then receives the bills (issuance numbers; step 37) and then records the transaction history for each issuance number of bills, i.e., equal to the number of bills paid. The coin/bill code records the "bill code" and the value/issuance number records the issuance number of each bill paid (step 38). If the number of bills is zero, steps 35 to 38 are skipped. A check is then made to determine whether or not the coin balance is equal to or more than the transaction balance (step 39). If the coin balance is equal to or more than the transaction balance (yes in step 39), the process goes to step 29. However, when the transaction balance is zero, steps 30, 31, and 33 are skipped. If the coin balance is less than the transaction balance (no in step 39), the process goes to processing of step 41 (FIG. 2B) to change the bill into coins. When the number of bills is zero, the result of step 39 usually becomes "no", since the result of determination of step 39 is the same as that of step 27.

In FIG. 2B, the card 1 of the payer adds the bill amount to the coin balance to create the (new) coin balance. The obtained balance is written in the data area for the update thereof (step 41) and then one bill (issuance number) is obtained from the data area (step 42). Subsequently, the bill (issuance number) is additionally registered in the invalid bill field of the data area (step 43). The issuance number of the bill taken out is deleted from the data area (step 44) and then the process goes to step 29. Although step 42 is to be executed before steps 43 and 44, the position thereof in the program may be changed only if this condition is satisfied.

In FIG. 2C, the transporter 2 checks to determine whether or not the transaction amount is equal to the total amount of the coins and bills received from card 1 of the payer (step 51). If these amounts match each other, the transporter 2 sends the card ID of the card 1, the receipt/payment code (=receipt code), and the transaction amount to the card 3 of the recipient (step 52). On receiving these items (step 53), the card 3 refers to the electronic money balance and the coin balance in the data area (step 54). In the payment of electronic money, when the bills (issuance numbers of the bills for payment) and/or coins (the value amount) are sent from the transporter 2 (step 55), the card 3 receives the electronic money (step 56). If there exist coins; the card 3 adds the value amount received to the coin balance to generate the (new) coin balance. The new coin balance is written in the data area to thereby update the data area (step 57) and then one record of transaction history is written in the area (step 58). In the transaction history, the receipt/payment code is set to "receipt code", the transaction ID is "card ID received from the transporter 2", the coin/bill code is set to "coin code", and the value amount/issuance number field includes the received value amount. Next, if there exists a bill, the issuance numbers of the bills received are registered to the data area (step 59). For each issuance number of a bill, one record is written as transaction history in the area (step 60). Finally, the transaction amount is added to the electronic money balance to create the (new) electric money balance. The resultant balance is written in the data area for the update thereof (step 61) and then the processing is terminated. Steps 57 to 60 may be executed in any sequence.

As described above, the electronic money card 1 of the payer automatically selects a combination of "coins" and "bills" in accordance with the amount of payment to execute a procedure for payment. However, it is unnecessary for the user to pay attention to the combination of "coins" and "bills" selected for the payment.

Figure 3:
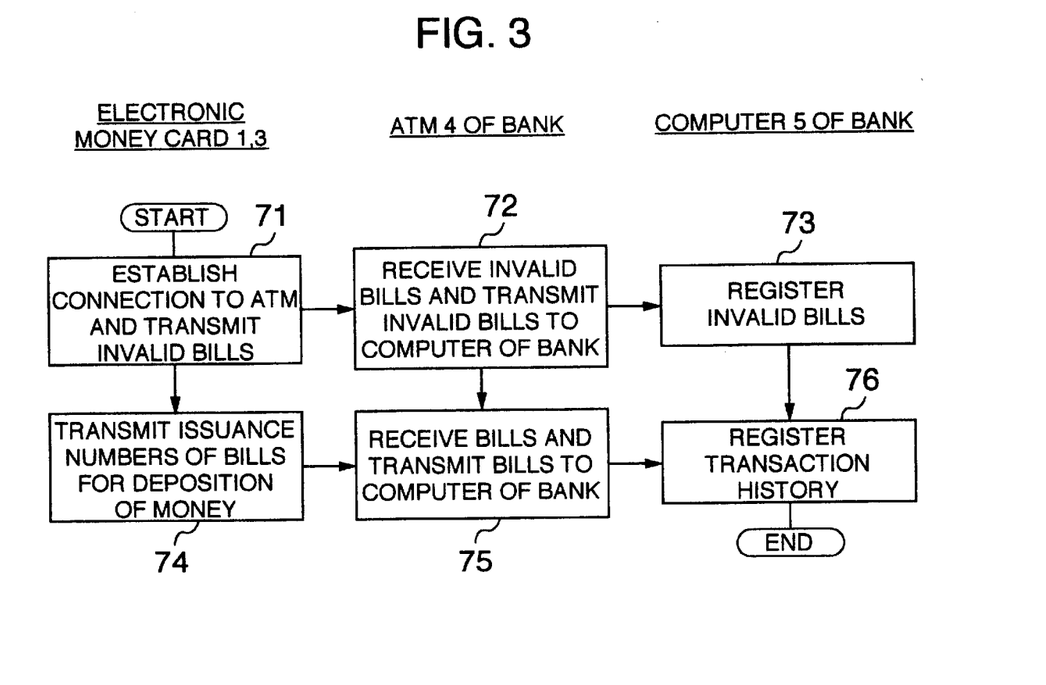
FIG. 3 is a flowchart showing a flow of processing in which an issuance number of a bill is transmitted to be accumulated in an electronic card/a computer 5 of a bank in the embodiment.

FIG. 3 shows in a flowchart a flow of processing of the registration of an invalid bill and bills in a depositing operation when bills are transported between the electronic money cards 1 and 3 and the computer 5 of a bank via the ATM 4 of the bank. When the card 1, 3 is installed in the ATM 4 to deposit or to draw money from the bank, the card 1, 3 automatically sends to the ATM 4 the card ID thereof and the issuance number of the invalid bill recorded therein (step 71). On receiving these items of information, the ATM 4 transmits the information to the computer 5 of the bank (step 72). The computer 5 then registers the information items to a storage area of invalid bills in an external storage of the computer 5 (step 73). When the possessor of the card indicates a deposit of money equal to or more than the coin balance to the ATM 4, the card 1, 3 transmits to the ATM 4 the issuance numbers of bills necessary for the deposit (step 74). The ATM 4 then transmits the numbers to the computer 5 of the bank (step 75). The computer 5 records the card ID, the bill issuance numbers, and the like in an area of transaction history of the external storage of the computer 5 (step 76). In the processing above, the card IDs of the cards 1 and 3 and the issuance numbers of the invalid and valid bills are recorded on the side of the bank. However, the transaction history recorded in the data areas of the card 1 and 3 is not passed to the bank side in any situation.

Figure 4:
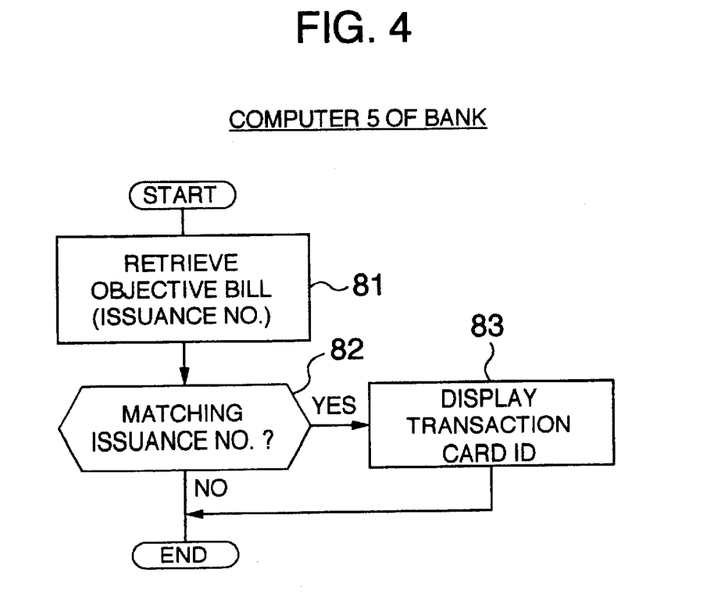
FIG. 4 is a flowchart showing a processing flow to trace a flow of money transported for money laundering.

FIG. 4 shows in a flowchart a flow of processing to trace money that has been laundered. In accordance with an objective issuance number of bill, the computer of the bank retrieves the transaction history and an invalid bill in the external storage (step 81). When a bill having the issuance number is detected (yes in step 82), the transaction card ID is displayed on the display unit (step 83). Using as a clue the possessor of the card ID, the police can check the transaction history in the data area of each money card to thereby find suspected laundered money in accordance with the final card ID thus retrieved.

In this connection, when the money transporter 2 is replaced with an ATM and the electronic money card of the recipient is substituted for a computer of the bank, the depositing operation of the ATM can also be carried out in the same processing procedure as for the paying operation shown in FIGS. 2A to 2C.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. An electronic banking method using an electronic money card of a type in which a token type and a value type are mixed, comprising the steps of:

storing issuance numbers of electronic money having a fixed face value and a balance of coin money in terms of a value amount in said electronic money card, paying the coin money if the coin money balance is sufficient for a transaction amount and paying bill money when the coin money balance is insufficient for payment, issuance numbers of bills paid/received being recorded in a transaction history in a memory area of said electronic money card; and reading from an electronic money card an issuance number of an invalid bill and issuance numbers of bill money in a depositing operation, and accumulating the numbers in a computer of a bank, the issuance number of the invalid bill being an issuance number of bill money which was changed into coins and hence became invalid.

2. An electronic banking method in accordance with claim 1, further including a step of reading, using an electronic money transporter, from an electronic money card of a payer at least one of issuance numbers of bills and a value amount of the coin money and, outputting at least one of the numbers and the value amount to an electronic money card of a recipient.

3. An electronic banking method using an electronic money card of a token and value mixed type, comprising the steps of:

storing issuance numbers of electronic money having a fixed face value and a balance of coin money in terms of a value amount in said electronic money card;

preferentially paying, when the card is used as an electronic money card of a payer, the coin money if the coin money balance is sufficient for a transaction amount and paying bill money when the coin money balance is insufficient for payment, and changing, for a transaction balance to which neither the coin money balance nor the bill money is applied, the bill money to a value amount of coin money to achieve the payment.

4. An electronic banking method in accordance with claim 3, wherein said paying step includes the steps of:

conducting, when the coin money balance is equal to or more than the transaction amount, the paying operation by subtracting the transaction amount from the coin money balance;

conducting, when the coin money balance is less than the transaction amount and is equal to or more than a face value of the bill, the paying operation by deleting issuance numbers of bills whose value amounts to a maximum within the transaction amount and setting a remaining amount as a transaction balance;

conducting, when the coin money balance is equal to or more than the transaction amount, the paying operation of the transaction balance by subtracting the transaction balance from the coin money balance; and conducting, when the coin money balance is less than the transaction amount or the transaction balance, the paying operation of the transaction amount of the transaction balance by changing bill money into a value amount of coin money and deleting an issuance number of the bill money.

5. An electronic banking method in accordance with claim 4, wherein said paying step further includes a step of registering, as an invalid bill, the issuance number of the bill money changed into the coin money to a storage means of said electronic money card.

6. An electronic banking method in accordance with claim 3, wherein said paying step further includes a step of storing, when the card is utilized as an electronic money card of a recipient, the issuance numbers of received bill money in said storage means and adding the coin money received to the coin money balance.

7. An electronic money processing method in an electronic money transporter handling an electronic money card in which a token type and a value type are mixed, comprising the steps of:

reading at least one of issuance numbers of bill money and a value amount of coin money from an electronic money card of a payer, said money card including storage means for storing therein issuance numbers of electronic money having a fixed face value and a balance of coin money in terms of a value amount, and processing means for preferentially paying the coin money if the coin money is sufficient for a transaction amount and paying bill money when the coin money balance is insufficient for payment, said processing means changing, for a transaction balance to which neither the coin money balance nor the bill money is applied, the bill money to a value amount of the coin money to achieve the payment; and outputting at least one of the issuance numbers of the bill money read and the value amount read to an electronic money card of a recipient.

8. An electronic banking method in an automatic transaction machine (ATM) handling an electronic money card in which a token type and a value type are mixed, comprising the steps of:

receiving from an electronic money card a card ID thereof, issuance numbers of deposited bill money, and an issuance number of an invalid bill, the issuance number of the invalid bill being an issuance number of a bill which was changed into coin money and hence became invalid, the electronic card including storage means for storing therein issuance numbers of electronic money having a fixed face value, a balance of coin money in terms of a value amount, and an issuance number of a bill converted into a value amount of coin money, and means for notifying issuance numbers of bill money indicated for a deposit operation and the issuance number of the invalid bill from the storage means; and transmitting said card ID received, the issuance numbers of the bill money deposited, and the issuance number of the invalid bill to a computer of a financial facility.

9. An electronic banking method in an automatic transaction machine (ATM) handling an electronic money card in which a token type and a value type are mixed, comprising the steps of:

receiving from an electronic money card a card ID thereof, issuance numbers of deposited bill money, and an issuance number of an invalid bill, the issuance number of the invalid bill being an issuance number of a bill which was changed into coin money and hence became invalid, the electronic card including storage means for storing therein issuance numbers of electronic money having a fixed face value, a balance of coin money in terms of a value amount, and an issuance number of a bill converted into a value amount of coin money, and means for notifying issuance numbers of bill money indicated for a deposit operation and the issuance number of the invalid bill to the ATM and deleting the issuance number of the bill money indicated for a deposit and the issuance number of the invalid bill from the storage means; and storing therein said card ID, the issuance numbers of the bill money deposited, and the issuance number of the invalid bill with a correspondence established therebetween.

10. An electronic money processing apparatus, comprising:

storage means for storing a token type electronic money to which an issuance number is given in a unit of a predetermined amount, said token type electronic money being respectively discriminated and managed, and a value type electronic money whose increase and decrease of an amount is managed without discriminating respective electronic moneys; and processing means for converting said token type electronic money to said value type electronic money under a predetermined condition.

11. An electronic money processing apparatus according to claim 10, wherein said processing means comprises means for converting said token type electronic money in a unit of issuance number to a value type electronic money having a value equivalent to a token type electronic money given with an issuance number.

12. An electronic money processing apparatus according to claim 11, wherein said processing means comprises means for managing said token type electronic money converted to said value type electronic money as an invalid bill in a unit of issuance number.

13. An electronic money processing system, comprising:

a first electronic money processing apparatus provided with:

storage means for storing a token type electronic money to which an issuance number is given in a unit of a predetermined amount, said token type electronic money being respectively discriminated and managed, and a value type electronic money whose increase and decrease of an amount is managed without discriminating respective electronic moneys; and processing means for converting said token type electronic money to said value type electronic money under a predetermined condition, and a second electronic money processing apparatus for managing an identification number of said first electronic money processing apparatus, an issuance number of an electronic money issued to said first electronic money processing apparatus and an issuance number of an electronic money changed to an invalid bill among said electronic money issued, while taking correlation between them.

14. An electronic money processing method, comprising the steps of:

storing a token type electronic money to which an issuance number is given in a unit of predetermined amount, said token type electronic money being respectively discriminated and managed, and a value type electronic money whose increase and decrease of an amount is managed without discriminating respective electronic moneys; and converting said token type electronic money to said value type electronic money under a predetermined condition.

15. A recording medium on which is stored a program for processing an electronic money, said program comprising:

a function for managing token type electronic money to which an issuance number is given in a unit of a predetermined amount, said token type electronic money being respectively discriminated and managed, and a value type electronic money whose increase and decrease of an amount is managed without discriminating respective electronic moneys; and a function for converting said token type electronic money to said value type electronic money under a predetermined condition.

\* \* \* \* \*